US008950078B2

(12) United States Patent
Engel

(10) Patent No.: US 8,950,078 B2
(45) Date of Patent: Feb. 10, 2015

(54) APPARATUS WITH INTERNAL OPTICAL REFERENCE

(71) Applicant: Carl Zeiss Industrielle Messtechnik GmbH, Oberkochen (DE)

(72) Inventor: Thomas Engel, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 13/959,957

(22) Filed: Aug. 6, 2013

(65) Prior Publication Data

US 2014/0041242 A1 Feb. 13, 2014

Related U.S. Application Data

(63) Continuation of application No. PCT/EP2012/065479, filed on Aug. 7, 2012.

(60) Provisional application No. 61/680,528, filed on Aug. 7, 2012.

(51) Int. Cl.
*G01B 11/03* (2006.01)
*G01B 11/00* (2006.01)
*G01B 21/04* (2006.01)

(52) U.S. Cl.
CPC ............ *G01B 11/005* (2013.01); *G01B 21/042* (2013.01); *G01B 11/03* (2013.01)
USPC .............................................. 33/503; 33/502

(58) Field of Classification Search
CPC ...... G01B 11/00; G01B 11/03; G01B 11/005; G01B 11/007; G01B 11/022
USPC .................................................. 33/503, 502
See application file for complete search history.

(56) References Cited

U.S. PATENT DOCUMENTS 6,822,749 B1    11/2004  Christoph
7,626,710 B2 *  12/2009  Finarov et al. ................ 356/625
(Continued)

FOREIGN PATENT DOCUMENTS

DE            198 16 270  A1    10/1999
DE      10 2009 054 703  A1     6/2011
(Continued)

OTHER PUBLICATIONS

International Search Report and Written Opinion of the International Searching Authority for PCT/EP2012/065479, (in German with English Translation), mailed Mar. 28, 2013; ISA/EP.

*Primary Examiner* — Christopher Fulton
(74) *Attorney, Agent, or Firm* — Harness, Dickey & Pierce, P.L.C.

(57) ABSTRACT

An apparatus for inspecting a measurement object, comprising a workpiece support for supporting the measurement object and a measuring head carrying an optical sensor. The measuring head and the workpiece support are movable relative to one another. The optical sensor has an objective and a camera designed to capture an image of the measurement object. The objective has a light entrance opening and a light exit opening, and comprises a multitude of lens-element groups arranged in the objective between the light entrance opening and the light exit opening one behind another along a longitudinal axis of the objective. Furthermore, the apparatus has a reflection element and a calibration arrangement. The reflection element can selectively be introduced into a beam path running from the measurement object through the objective to the camera. The calibration arrangement is coupled into the beam path to the camera by means of the reflection element.

20 Claims, 9 Drawing Sheets

(56) References Cited

U.S. PATENT DOCUMENTS

| | | |
|---|---|---|
| 8,027,037 B2 * | 9/2011 | Littau et al. .................... 356/388 |
| 8,179,530 B2 * | 5/2012 | Levy et al. ..................... 356/401 |
| 8,825,427 B2 * | 9/2014 | Kunzmann et al. ............. 702/95 |
| 2009/0141131 A1 * | 6/2009 | Arai .............................. 348/187 |

FOREIGN PATENT DOCUMENTS

| | | |
|---|---|---|
| EP | 2 068 113 A1 | 6/2009 |
| WO | WO 99/53268 | 10/1999 |
| WO | WO 00/42387 | 7/2000 |

* cited by examiner

APPARATUS WITH INTERNAL OPTICAL REFERENCE

CROSS-REFERENCE TO RELATED APPLICATIONS

This application is a continuation of International PCT application No. PCT/EP2012/065479, filed Aug. 7, 2012. This application also claims the priority of U.S. provisional application No. 61/680,528, filed Aug. 7, 2012. The entire contents of these priority applications are incorporated herein by reference.

BACKGROUND OF THE INVENTION

The present invention relates to an apparatus, in particular a coordinate measuring machine, for inspecting a measurement object, comprising a workpiece support for supporting the measurement object, comprising a measuring head carrying an optical sensor, wherein the measuring head and the workpiece support are movable relative to one another, wherein the optical sensor has an objective and a camera, which is designed to capture an image of the measurement object through the objective, wherein the objective has a light entrance opening and a light exit opening, wherein the objective has a multitude of lens-element groups which are arranged in the objective between the light entrance opening and the light exit opening one behind another along a longitudinal axis of the objective.

Furthermore, the present invention relates to a method for calibrating an apparatus for inspecting a measurement object.

The use of optical sensors in conjunction with coordinate measuring machines makes it possible in many cases to measure geometrical properties of a measurement object very rapidly. One disadvantage of known coordinate measuring machines comprising optical sensors heretofore has been that the optical sensors are limited to specific measurement tasks and specific workpiece properties. The optical sensors are generally optimized for a specific type of measurement task, for instance with regard to the achievable measurement accuracy or the measurement range. Problems can be posed for example by workpieces which have large height differences parallel to the optical axis of the sensor. In part, different optical and/or tactile sensors are used in order to be able to react flexibly to different measurement requirements, wherein the individual sensors in each case perform only part of the overall measurement task. In general, each individual sensor is optimized towards a specific measurement task. Primarily optical sensors therefore have a respective individual optics which is well suited to a specific purpose of use and is less well suited to other purposes.

In this case, such an optics has to be checked at regular intervals. This serves to detect, and if appropriate compensate for, possible changes in the positioning of the optical elements relative to one another, whether as a result of physical external influences, such as e.g. collisions, or e.g. on account of thermal influences.

If optics having a variable imaging scale are used, the optical elements are typically adjusted, with the aid of actuating cams. In this case, either the lens elements can be coupled by means of a cam disk, or else the position of the optical elements relative to one another can be set by means of separate drives. In general, one relies here on the actuating accuracy of the actuating cams or of the drives. However, these can also change over time.

In order to check e.g. set magnifications or actually the imaging behavior of an optics, at specific test intervals a test body having a known structure in terms of geometry and/or size can be placed below the optics or the objective and a size of the imaged structure on the camera can be measured. In this way, the entire beam path can then be calibrated with regard to magnification, the imaging scale or actually the optical properties of the objective. In principle, it is then also possible to readjust the magnification or the imaging scale if the image deviates from the desired imaging scale by more than a step size of the drive.

Typical calibration objects are the glass carriers that are lacquered, if appropriate, on the rear side. The structure is then applied on the top side or front side. Calibration objects are positioned in the apparatus and then measured.

Calibration methods which can operate with the positioning of a measurement object is mentioned e.g. in the document DE 10 2009 054 703 A1. A coordinate measuring machine is disclosed by the document WO 99/53268 A1, for example.

Since a user has to handle the calibration objects, there is the risk of said calibration objects being soiled or even scratched. Moreover, a user has to implement and typically also accompany the calibration expenditure, which costs work time.

It is an object of the present invention to eliminate the disadvantages mentioned above and to provide improved possibilities for calibration in an apparatus for inspecting a measurement object.

SUMMARY OF THE INVENTION

In accordance with a first aspect of the invention, it is therefore provided an apparatus for inspecting a measurement object, comprising a workpiece support for supporting the measurement object, comprising a measuring head carrying an optical sensor, wherein the measuring head and the workpiece support are movable relative to one another, wherein the optical sensor has a objective and a camera, which is designed to capture an image of the measurement object through the objective, wherein the objective has a light entrance opening and a light exit opening, wherein the objective has a multitude of lens-element groups which are arranged in the objective between the light entrance opening and the light exit opening one behind another along a longitudinal axis of the objective, and wherein the apparatus furthermore has a reflection element and a calibration arrangement, wherein the reflection element can selectively be introduced into a beam path running through the objective to the camera, in order to couple the calibration arrangement into the beam path to the camera by means of the reflection element.

A "reflection element" should be understood in the general sense to mean an optical element that reflects a certain proportion of incident light. In the simplest sense, this can be a mirror, i.e. an optical element having a reflectance of almost or exactly 100%. However, provision can also be made, for example, for the reflection element to be formed by a beam splitter that reflects a certain percentage of incident light. In this case, the beam splitter can perform beam splitting according to wavelength, polarization and/or intensity. In the case of a beam splitter that effects splitting according to intensity, provision can be made, for instance, for this beam splitter to transmit a certain proportion, e.g. 50%, of incident light and to reflect a certain proportion, e.g. likewise 50%, of incident light. In particular, in one example, the reflection element can be formed by the reflective rear side of a beam splitter.

In particular, the calibration arrangement is optically coupled into the beam path to the camera by means of the reflection element. In particular, this is effected coaxially with respect to the longitudinal direction or an optical axis of the objective or an optical axis of the multitude of lens-element groups of the objective.

In this way it becomes possible to keep the calibration arrangement protected as part of the apparatus, in particular within a housing of the apparatus. The calibration arrangement is then selectively rendered "active" by the introduction of the reflection element into the beam path. By the illumination of the calibration arrangement, e.g. by means of reflected light provided in the apparatus anyway or by means of a dedicated illumination device of the calibration arrangement, the camera can record images of a calibration standard provided in the calibration arrangement and can use them for calibrating the objective.

In this way, the test of the calibration can take place fully automatically. By way of example, it is possible for a calibration to be carried out by means of the proposed apparatus in intermissions or at night. In this case, the apparatus would not have to be moved to a specific position and there is no need for a calibration standard to be applied separately on the workpiece support. Protection of the calibration standard within a housing of the apparatus contributes to avoiding damage and/or contamination of the calibration standard. In this case, it should be taken into consideration that calibration standards are generally relatively expensive and procuring them again is therefore associated with high costs. Parameters to be calibrated can be, for example, the imaging scale or the magnification, the imaging quality, for example on the basis of the determination of imaging characteristic figures. A subsequent optimization can be effected for instance with regard to minimized imaging aberrations, or else imaging aberrations to be kept available in a targeted manner.

The image processing—necessary for calibration—of the recorded images of the calibration standard can be effected directly in the camera or else in downstream image processing systems, for example graphics cards. In this way, deviations from the expected optical properties, e.g. the imaging scale, are ascertained, such that corrections can be implemented in the optics or the objective or in the control curves.

In accordance with a second aspect of the invention, a method for calibrating an apparatus for inspecting a measurement object comprising the following steps is provided:

providing an apparatus comprising a measuring head carrying an optical sensor, wherein the optical sensor has an objective and a camera, which is designed to capture an image of the measurement object through the objective, wherein the objective has a light entrance opening and a light exit opening, wherein the objective has a multitude of lens-element groups which are arranged in the objective between the light entrance opening and the light exit opening one behind another along a longitudinal axis of the objective, and wherein the apparatus furthermore has a reflection element and a calibration arrangement, introducing the reflection element into a beam path running through the objective to the camera, wherein the calibration arrangement is thereby coupled into the beam path to the camera by means of the reflection element, illuminating the calibration arrangement, detecting calibration images by means of the camera, and calibrating the apparatus by evaluating the calibration images.

In one refinement of the method, it is possible, if appropriate, for the calibration to be followed by a step of adjusting the apparatus. This can be done in order to achieve the required image quality or to keep the desired imaging aberrations available. Afterward, the steps of detecting and calibrating can be carried out again.

In one refinement of the apparatus it can be provided that the reflection element can be introduced into the beam path between two lens-element groups of the multitude of lens-element group.

In this way, therefore, it becomes possible to couple the calibration arrangement into the objective. The calibration can be carried out fully automatically within the apparatus in this way. External manual influencing for carrying out the calibration is no longer necessary.

In a further refinement of the apparatus it can be provided that the multitude of lens-element groups comprises at least one lens-element group which is movable parallel to the longitudinal direction or longitudinal axis, wherein the reflection element can be introduced into the beam path on the object side of all lens-element groups which are movable parallel to the longitudinal direction or longitudinal axis.

In an objective having variable magnification, for example, a plurality of lens-element groups are configured in a movable fashion in order to set the magnification or the imaging scale in a suitable manner. During the calibration, particularly the adjustment of this movable lens-element group is then intended generally to be checked. In this respect, the reflection element is to be arranged on the object side of all the movable lens-element groups, such that the latter are situated in the beam path from the camera to the calibration arrangement. All the movable lens-element groups can be checked in this way. Possible stationary lens-element groups arranged further on the object side of the reflection element can be provided in the calibration arrangement or simulated by the latter as will be explained below.

In a further refinement of the apparatus it can be provided that the calibration arrangement has at least one real calibration object.

An actual physical calibration object is thus provided in the calibration arrangement. This calibration object can be illuminated by means of a reflected light that follows in the apparatus anyway, via the reflection element, or the calibration object can be illuminated by means of a dedicated illumination device of the calibration arrangement, in particular illuminated from behind. In this way, it becomes possible to readjust the optical path to a calibration object within the calibration arrangement as if a calibration object were received on the workpiece support.

In a further refinement of the apparatus it can be provided that the calibration arrangement has a calibration lens-element assembly, wherein the calibration lens-element assembly corresponds in terms of its optical properties to the lens-element groups arranged on the object side of the reflection element.

By way of example, it can be provided that all the movable lens-element groups of the multitude of lens-element groups are arranged on the image side of the reflection element, but one or a plurality of stationary lens-element groups are also arranged on the object side. These lens-element groups are then not situated in the beam path from the camera to the calibration arrangement or the calibration object. However, in order nevertheless to readjust the optical path, a calibration lens-element assembly having the same optical properties is to be provided in the calibration arrangement, such that the calibration object is imaged onto the camera as if it were positioned on the workpiece support.

In a further refinement of the apparatus it can be provided that the calibration arrangement has a plurality of real calibration objects, wherein the calibration arrangement has at least one calibration beam splitter, and wherein the at least one calibration beam splitter is arranged in such a way that the beam paths of all the real calibration objects are superimposed onto the reflection element.

In a further refinement it can be provided in this case that in the beam path of the at least one real calibration object a retardation section is coupled in by means of two retardation beam splitters.

Furthermore, it can be provided that a shutter element is arranged in each or at least one beam path to a real calibration object or in the optical retardation section, in order selectively to block the corresponding beam path.

If the objective or the optics of the apparatus has more than one operating distance, then for the operating distances to be calibrated it is necessary either to install a plurality of calibration objects at the different desired distances within the calibration arrangement and to superimpose the light paths e.g. by means of the calibration beam splitter. With respect to the operating distance to be checked, if appropriate only the illumination of the associated calibration object is then switched on. In the case of the use of reflected-light illumination, all the images would firstly be superimposed, the illumination being correct only for the calibration object at the operating distance set by means of the objective. As a result, only the image of the focused calibration object is imaged with high imaging quality and sufficient brightness of the camera. If such a separation by means of sharp and unsharp imagings does not suffice, optical switching of only one calibration object at the operating distance to be checked can be carried out by means of the shutter elements in the beam paths.

In this case, a "operating distance" can be understood to be either a "mechanical operating distance", i.e. a clear distance between the first disturbing contour of the objective and the surface of the measurement object, or an "optical operating distance", i.e. a clear distance between the first optical element of the objective and a focal plane of the objective.

Instead of a plurality of calibration objects, one or a plurality of optical retardation lines can also be provided between the calibration object and the calibration lens-element assembly, and then readjust the different operating distances. Here, too, it may be necessary for shutter elements to be provided in the individual light paths with individual retardation lines, which shutter elements again free only the operating distance to be tested in each case and optically block all other paths.

In a further refinement of the apparatus it can be provided that the calibration arrangement has at least one optical image storage element, wherein the optical image storage element is a holographic optical element or a diffractive optical element.

In this way, it can be provided that precisely an optical field such as would also have been generated on the object side of the reflection element if a calibration standard had been arranged on the workpiece support is generated by means of the optical image storage element and the illumination thereof.

In a further refinement of the apparatus it can be provided that an optical field is stored on the optical image storage element, said optical field corresponding to the optical field or to the imaging of a calibration object arranged on the object side of the reflection element, in particular to a calibration object imaged by the lens-element groups arranged on the object side of the reflection element, in particular in the object plane.

In this case, the terms "on the image side" and "on the object side" relate to the set-up of the apparatus and of the objective when a measurement object actually present on the workpiece support is inspected.

In this way, it becomes possible to set up the calibration arrangement in a space-saving manner. In this case, the optical field is stored either on a holographic optical element or on a diffractive optical element; in particular, a computer generated hologram (CGH) can be provided. In particular, this makes it possible to simulate even large operating distances in the calibration arrangement, even though the latter actually has significantly smaller dimensions than the operating distances.

In a further refinement of the apparatus it can be provided that the calibration arrangement has an optical image storage element that is a holographic optical element, wherein a plurality of optical fields are stored on the optical image storage element in a wavelength-dependent manner and/or in an illumination-angle-dependent manner.

Furthermore, in a refinement of the apparatus it can be provided that the calibration arrangement has a plurality of optical image storage elements, wherein the calibration arrangement has at least one calibration beam splitter, and wherein the at least one calibration beam splitter is arranged in such a way that the beam paths of all the optical image storage elements are superimposed onto the reflection element.

If the more than one operating distance from the objective is intended to be checked, a plurality of optical fields can be stored on a hologram plate in this way. In principle, provision can be made for said plurality of optical fields to be superimposed when they are irradiated with an illumination device. Under certain circumstances, this may already suffice when only one of said optical fields is imaged sharply. Alternatively, the optical fields can, however, also be recorded using different light sources or illumination units from different directions and/or with different colors. As a further alternative, it is also possible, of course, to produce a plurality of separate holograms each representing an operating distance. For color-dependent calibration processes, provision can also be made for recording a dedicated hologram for each color, these holograms then being read out individually.

The calibration object or the object stored on the image storage element can be one of a plurality of possible objects. Firstly, amplitude objects are possible which contain one-, two- or three-dimensional geometrical objects, that is to say e.g. grating patterns, squares, circles in positive or negative representation. Furthermore, phase objects can also be used in order to produce structures on the image recording sensor. Mixed objects comprising amplitude and phase objects, such as are also employed in lithography, can also be used. Structures below the resolution limit are also possible, in order thus e.g. to obtain imagings of quasi ideal point images which can be used for determining characteristic figures for the imaging quality. Regular periodic and non-periodic arrangements are also possible in order to determine the imaging properties over the field of view of the optics and the camera.

In a further refinement of the apparatus it can be provided that the objective has a diaphragm and at least four lens-element groups, that a first lens-element group is the lens-element group arranged the furthest on the object side and is embodied in a stationary fashion, that at least a second lens-element group and a third lens-element group are displaceable relative to the first lens-element group along the longitudinal axis, and that the reflection element can be introduced between the first lens-element group and the second lens-element group.

In this way, e.g. an objective having a variable imaging scale can be provided. The first lens-element group arranged on the object side is stationary in this case. A structural space in which the reflection element can be introduced is provided between the first lens-element group and the further movable lens-element groups. The light then passes between the camera and the calibration arrangement through the movable lens-element groups between the camera and the calibration arrangement. In this way, the intensity distribution of the calibration structure radiated onto the camera from the calibration arrangement can be recorded and subsequently evaluated by means of image processing.

In a further refinement of the apparatus it can be provided that a diaphragm and the second lens-element group, the third lens-element group and a fourth lens-element group from the at least four lens-element groups are displaceable relative to the first lens-element group along the longitudinal axis, wherein the second lens-element group is arranged between the first lens-element group and the diaphragm, and wherein the third and fourth lens-element group are arranged between the diaphragm and the light exit opening.

In this way, an objective is provided in which at least four separate lens-element groups are arranged on a common optical axis. The first lens-element group (as seen from the light entrance opening or front side) is stationary. It is followed along the optical axis by three further lens-element groups, which are in each case displaceable relative to the first lens-element group along the optical axis. Optionally, in some refinements, the objective has a fifth lens-element group, which is arranged in the region of the light exit opening and is stationary. The lens-element groups together generate an image on an image sensor coupled to the objective via the interface. On account of the individual displaceability of the three lens-element groups, the new objective can be set to different imaging conditions in a very flexible manner. As explained below on the basis of one preferred exemplary embodiment, the new objective makes possible, in particular, a variable setting of the magnification and/or a variable setting of the operating distance. In the preferred exemplary embodiments, the new objective is telecentric over the entire setting range of the magnification and over the entire setting range of the operating distance, which can be achieved very well with the aid of the axially displaceable diaphragm. The individual adjustability of the three lens-element groups furthermore makes it possible to realize a constant magnification over the entire variation range of the operating distance or a constant focusing to an operating distance over the entire magnification range. These properties make it possible for the first time to measure a measurement object having great height differences parallel to the optical axis of the objective with constant parameters, without the optical sensor as such having to be moved nearer to the measurement object or further away from the measurement object. This last makes possible very fast measurements at a multitude of measurement points. The stationary first lens-element group furthermore has the advantage that the "disturbing contour" of the optical sensor in the measurement volume of the coordinate measuring machine is always the same. The risk of the sensor colliding with the measurement object is reduced. Furthermore, the variable settability makes it possible to dispense with changeable optics, which were used in part in previous coordinate measuring machines in order to perform different measurement tasks.

In a further refinement of the apparatus it can be provided that at least two lens-element groups are displaceable parallel to the longitudinal axis.

However, the invention is not restricted to objectives in which the imaging scale or the focal position can be varied. It is also possible to test fixed focal lengths by means of the proposed calibration arrangement if a corresponding reflection element can be introduced. Since often it is possible only with difficulty to focus on a mirroring element, if appropriate an auxiliary marking can be applied on the mirror surface or the surface of the reflection element in order to simplify focusing by means of the camera.

In a further refinement of the apparatus it can be provided that the reflection element can be introduced into the beam path on the image side or on the object side of the multitude of lens-element groups.

Consequently, it is also possible to pass through the entire objective with the beam path before the calibration arrangement is coupled in. An arrangement on the image side of the multitude of lens-element groups can be provided, for example, in order to check changes in an image sensor or camera chips of the camera caused on account of heating, for example.

In principle, the apparatus can be used with telecentric or non-telecentric systems or objectives and arbitrary mixed forms. The apparatus can be a coordinate measuring machine, in principle; it can e.g. also be a microscope, e.g. a stereomicroscope having two separate beam paths for the object imaging. In this case, reflection elements with associated calibration arrangement can be provided for each beam path; however, provision can also be made for providing only one calibration arrangement, which can be coupled into each of the beam paths of the stereomicroscope by means of a reflection element.

A general advantage of the refinements which operate with a holographic optical element is that once a master hologram has been generated, a reproduction of the hologram can be carried out cost-effectively for series production. The same correspondingly applies to diffractive optical elements as well.

If at least one lens-element group is also provided in the objective on the object side of the reflection element, the same object-side at least one lens-element group that would actually be present is not used in the calibration arrangement. Therefore, if appropriate it is necessary also to provide a correction that detects the difference between calibrations by means of "genuine" imaging via the lens-element groups of the objective that are present on the object side with a calibration object on the workpiece carrier and a calibration by means of the calibration arrangement described above. This correction only has to be detected once. Afterward, the calibration as described above can be effected. It goes without saying that it is also possible to check this correction with regard to the object-side lens-element groups, but this is the case significantly less frequently than is the case for the movable optical elements of the objective.

In a further refinement of the apparatus it can be provided that the elements of the calibration arrangement, in particular a holographic or diffractive optical element or the real calibration object, are fitted on a thermally stable carrier. The thermally stable carrier can be produced, e.g. from glass, quartz glass or Zerodur. Zerodur is a glass-ceramic material from Schott AG, Mainz, Germany. This material has a very low coefficient of thermal expansion.

In a further refinement of the apparatus it can be provided that the calibration arrangement is arranged within a housing of the apparatus.

In this way, the calibration arrangement, in particular the at least one real calibration object or the at least one optical image storage element, can be protected against external influences, in particular damage. In particular, this furthermore also simplifies the process of automatically carrying out a calibration since the apparatus does not have to be moved into a special position for carrying out a calibration.

In a further refinement, the first, second, third and fourth lens-element groups in each case consist of at least two objective elements. In the preferred exemplary embodiments, each lens-element group comprises at least one cement element, i.e. at least two individual objective elements in each of the four lens-element groups are connected permanently and over a large area along their optically active surfaces.

This refinement reduces the number of interfaces and therefore contributes to a high imaging quality over a large spectral operating range. In one preferred exemplary embodiment, the four lens-element groups merely form fourteen interfaces.

In a further refinement, the objective has a separate cover glass, which is arranged upstream of the first lens-element group in the region of the light entrance opening.

In this refinement, light which enters into the beam path of the objective via the light entrance opening firstly impinges on the cover glass and only afterwards passes through the series of lens-element groups to the light exit opening. The arrangement of a separate cover glass upstream of the first lens-element group is an unusual measure for measurement objects since the cover glass in any case influences the optical properties of the objective or the beam path thereof. In the preferred exemplary embodiments, the optical properties of the cover glass are therefore taken into account in the correction of the lens-element groups, that is to say that the cover glass is included in the overall correction of the objective. The provision of a separate cover glass upstream of the first lens-element group is unusual particularly if the first lens-element group is designed for generating a defined longitudinal chromatic aberration, which is the case in preferred exemplary embodiments of the new objective. However, the refinement has the advantage that a separate cover glass can be more easily cleaned and exchanged, if appropriate, if the light entrance opening of the objective is soiled or even damaged during everyday operation. Accordingly, the new objective in preferred exemplary embodiments is designed such that the separate cover glass is held reversibly and non-destructively releasably in the objective body.

In a further refinement, the first and second lens-element groups together define a focal point lying between the second and third lens-element groups, wherein the control curve for the diaphragm and the control curve for the second lens-element group are coordinated with one another such that the diaphragm is always arranged at the focal point or in the focal plane.

This refinement ensures for the new objective, despite the flexible variation possibilities, an at least object-side telecentricity over all magnifications and operating distances, if the diaphragm aperture is chosen appropriately for the magnification setting or the operating distance. The object-side telecentricity is advantageous in order to determine in particular the depth of bores, projections or recesses on a measurement object because the "view" of the measurement object is largely constant despite the different operating distances in these cases. A perspective distortion in the imaging of the measurement object is advantageously avoided by virtue of an object-side telecentricity.

In a further refinement, the diaphragm has a variable diaphragm aperture, which preferably varies in a manner dependent on the position of the diaphragm along the optical axis.

In this refinement, the new objective has a further degree of freedom, namely the aperture of the diaphragm. This makes it possible to vary the numerical aperture of the objective and thus to vary the achievable resolution of the objective. In preferred exemplary embodiments, the abovementioned control curves including the individual control curve for the diaphragm aperture are embodied such that the objective offers an operating mode with a constant image-side aperture over different operating distances. This operating mode is advantageous in order to be able to operate with a constantly high measurement accuracy in the image over different operating distances.

In the preferred exemplary embodiments, the diaphragm is situated centrally with respect to the optical axis, to be precise with a centering error that is less than 20 µm and is preferably less than 10 µm. The diaphragm is preferably an iris diaphragm that is drivable individually in a motor-operated manner, wherein the driving is effected using a control curve belonging to the set of curves mentioned above. These exemplary embodiments enable a simple implementation and a constantly high measurement accuracy over the entire operating range.

In a further refinement, the objective has a multitude of slides and motor-operated drives, wherein the second, third and fourth lens-element groups and the diaphragm are in each case coupled to a dedicated slide that is adjustable along the optical axis, and wherein the slides are individually movable with the aid of the motor-operated drives.

In this refinement, the elements that are adjustable along the optical axis are in each case coupled to a dedicated drive. In some exemplary embodiments, the drive is a stepper motor, which preferably operates in full-step operation since this results in a low heat input into the objective. The refinement enables a modular and comparatively cost-effective realization. As an alternative, it is also possible to use DC motors, in particular in a brushless embodiment.

In a further refinement, the first lens-element group has a positive refractive power. Preferably, the second lens-element group has a negative refractive power, the third lens-element group has a positive refractive power and the fourth lens-element group has a negative refractive power.

In practical experiments this refinement has proved to be very advantageous for achieving a compact design and a small disturbing contour of the objective in the measurement volume of the new coordinate measuring machine.

In further exemplary embodiments, a stripe pattern or some other structured illumination can be coupled in via the further interface, and is analyzed for example on the basis of the image captured by the camera in order to measure a measurement object. Preferably, a further clearance is provided between the fourth lens-element group and the light exit opening of the objective, a beam splitter likewise being arranged in said further clearance. A third interface is preferably arranged at the level of the further beam splitter, such that the input and output coupling of illumination and/or signals is also possible downstream of the optical system comprising the four lens-element groups. The flexibility and the scope of use of the new objective and of the corresponding coordinate measuring machine are thus increased even further.

It goes without saying that the features mentioned above and those yet to be explained below can be used not only in the combination respectively indicated, but also in other combinations or by themselves, without departing from the scope of the present invention.

BRIEF DESCRIPTION OF THE DRAWINGS

Exemplary embodiments of the invention are illustrated in the drawing and are explained in greater detail in the following description. In the figures.

DETAILED DESCRIPTION OF THE PREFERRED EMBODIMENTS

Figure 1:
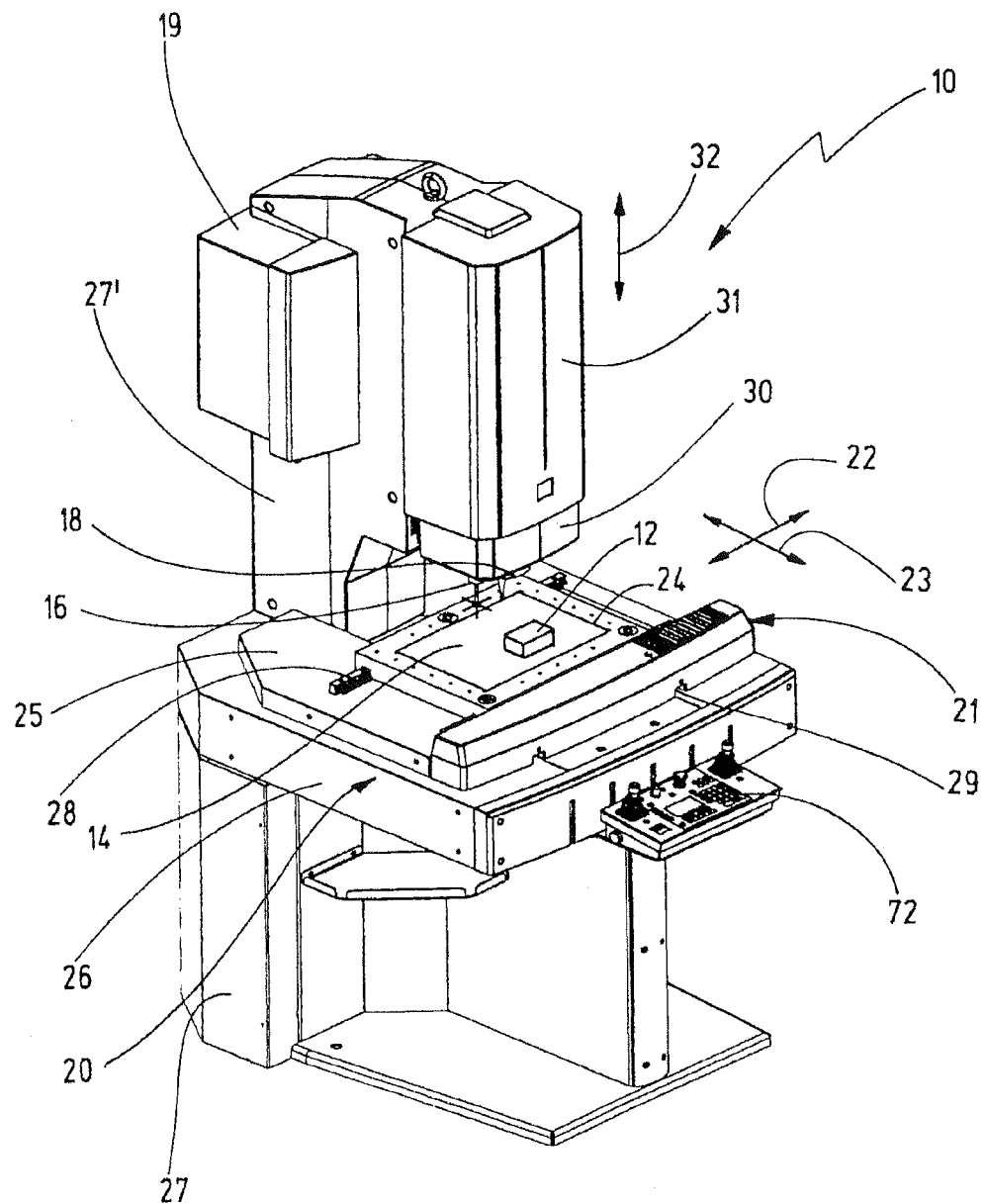
FIG. 1 shows an exemplary embodiment of a coordinate measuring machine in a view obliquely from the front.

FIG. 1 shows an apparatus 10 for inspecting a measurement object 12 arranged on a workpiece support 14. In the embodiment illustrated, the apparatus 10 is a coordinate measuring machine. The measurement object 12 is measured by means of one or a plurality of optical sensors 18. Optionally, one or a plurality of tactile sensors 16 can additionally also be provided.

Coordinate measuring machines are generally known in the prior art. They are used, for example in the context of quality assurance, to check workpieces or to determine the geometry of a workpiece completely in the context of so-called "reverse engineering". Furthermore, a wide variety of further application possibilities are conceivable, thus for example including the additional use for inspecting surfaces.

In such coordinate measuring machines, different types of sensors can be used to detect the coordinates of a workpiece to be measured. By way of example, sensors that effect tactile measurement are known for this purpose, such as are sold for instance by the applicant under the product designation "VAST", "VAST XT" or "VAST XXT". In this case, the surface of the workpiece to be measured is probed with a probe pin whose coordinates in the measurement space are continuously known. Such a probe pin can also be moved along the surface of a workpiece, such that in such a measuring process in the context of a so-called "scanning method" a multitude of measurement points can be detected at defined time intervals.

Furthermore, it is known to use optical sensors which enable the coordinates of a workpiece to be detected contactlessly. One example of such an optical sensor is the optical sensor sold by the applicant under the product designation "ViScan".

The sensors can then be used in various types of measurement setups. One example of such a measurement set-up is a table set-up, as shown in FIG. 1. One example of such a table set-up is the product "O-INSPECT" from the applicant. In such a machine, both an optical sensor and a tactile sensor are used to carry out different inspection tasks on one machine and ideally with a single clamping of a workpiece to be measured. In this way, many inspection tasks for example in medical technology, plastics technology, electronics and precision mechanics can be carried out in a simple manner. It goes without saying that, furthermore, various other set-ups are also conceivable.

Such sensor systems or sensor heads that carry both tactile and optical sensors are becoming increasingly important in coordinate measuring technology. A combination of tactile and optical sensors makes it possible to combine in a single coordinate measuring machine the advantages of the high accuracy of a tactile measuring system with the speed of an optical measuring system. Furthermore, calibration processes during sensor changes are avoided, as is possible reclamping of a workpiece.

Traditionally, the sensor head, which can also be designated as sensor system, is connected to a carrier system that supports and moves the sensor system. Various carrier systems are known in the prior art, for example gantry systems, stand, horizontal arm and arm systems, all kinds of robot systems and finally closed CT systems in the case of sensor systems operating with X-rays. In this case, the carrier systems can furthermore have system components that enable the sensor head to be positioned as flexibly as possible. One example thereof is the rotary-pivoting articulated joint from the applicant sold under the designation "RDS". Furthermore, various adapters can be provided in order to connect the different system components of the carrier system among one another and to the sensor system.

Consequently, the use of the apparatus 10 and the coordinate measuring machine 100 are not restricted to the table set-up illustrated in FIG. 1 and the corresponding carrier system, but rather can also be used with all other types of carrier systems. Furthermore, the apparatus 10 can also generally be used in multi-sensor measuring systems or in a material microscope.

The apparatus 10 furthermore has a measuring table 20. A positioning device 21 is situated on the measuring table 20. Said positioning device is provided, in particular, for positioning the measurement object 12 parallel to an X-axis 19 and to a Y-axis 23. In this case, the X-axis 19 and the Y-axis 23 span a measuring plane.

By way of example, an X-table 24 and a Y-table 25 can be provided for positioning purposes. The X-table 24 is movable parallel to the X-axis 21 and the Y-table 25 is movable parallel to the Y-axis 19. Both are arranged on a baseplate 26. The baseplate 54 is carried by a machine frame 27 and 27'.

The movement of the X-table 24 and of the Y-table 25 is guided by linear guides in the X-direction 28 and in linear guides in the Y-direction 29. This set-up corresponds to the so-called "table set-up". As already explained above, other carrier systems are also conceivable.

The apparatus 10 furthermore has a measuring head 15. One or a plurality of tactile sensors 16 can be arranged on the measuring head 15. Furthermore, the apparatus 10 is arranged on the measuring head 15. Furthermore, one or a plurality of further optical sensors 18 can also be arranged on or in the measuring head 15. The measuring head 15 therefore serves to couple the one or the plurality of optical sensors 18 and possibly a tactile sensor 16 to a carrier structure, for example a Z-slide 30. The measuring head 15 can be a closed housing construction, but it can also be embodied in an open fashion. By way of example, the measuring head 15 can also have the form of a simple plate on which the one or the plurality of optical sensors 18 and possibly the tactile sensor 16 are fixed. Furthermore, all further possible forms for coupling the one or the plurality of optical sensors 18 and possibly the tactile sensor 16 to the carrier structure are also conceivable.

The measuring head 15 is held on the Z-slide 30, which is guided in a slide housing 31 parallel to a Z-axis 32. Said Z-axis 32 is perpendicular to the X-axis 22 and to the Y-axis 23. The X-axis 22, the Y-axis 23 and the Z-axis 32 thus form a Cartesian coordinate system.

The apparatus 10 furthermore has an operating console 72. The individual elements of the apparatus 10 can be driven by means of the operating console 72. Furthermore, it is possible to predetermine inputs at the apparatus 10. In principle, it can also be provided that a display device (not illustrated) is arranged in the operating console 72 or elsewhere, in order to convey measurement value outputs to a user of the apparatus 10.

Figure 2:
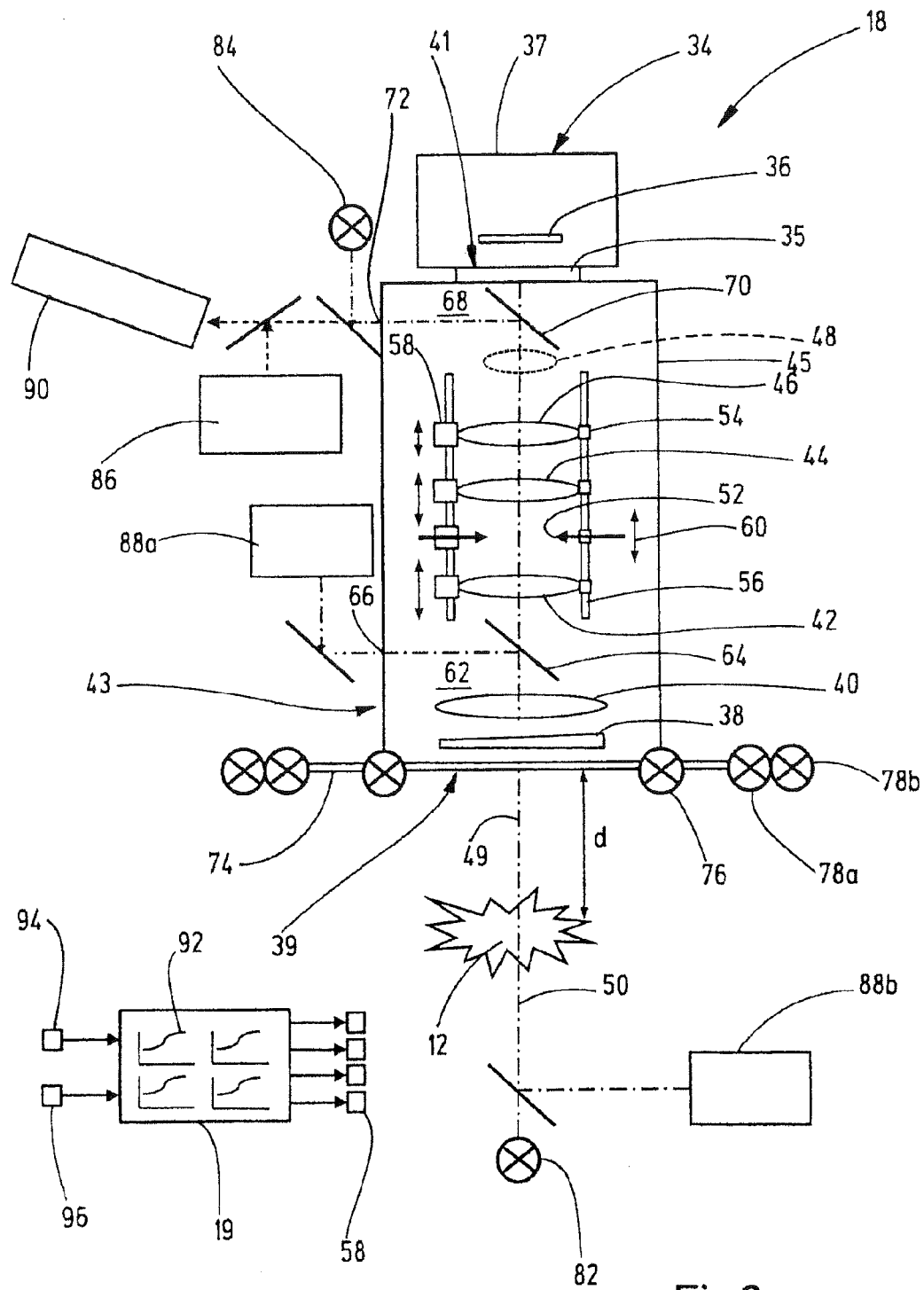
FIG. 2 shows a schematic illustration of the objective from the coordinate measuring machine from FIG. 1.

FIG. 2 shows an exemplary embodiment of the optical sensor 18, wherein the optical sensor 18 in this exemplary embodiment strictly speaking comprises a plurality of optical sensors which can be selectively present and used. The new objective can furthermore be combined with further optical sensors, for instance with a deflectometrically measuring sensor.

The sensor 18 comprises a objective 43 having a objective body 45. In typical exemplary embodiments, the objective body 45 is a tube having a light entrance opening 39 and a light exit opening 41, which are arranged at opposite ends of the tube. In principle, however, the objective body 45 can also have a form that deviates from a tube.

An interface 35 serving for connecting a camera 34 to an image sensor 36 is formed at the light exit opening 41. In preferred exemplary embodiments, the interface 35 is a standardized or widely used interface for coupling cameras and lenses, for instance a so-called F-mount or a so-called C-mount. In some exemplary embodiments, however, the interface 35 is a proprietary interface that makes it possible, in particular, to connect the housing 37 of the camera 34 directly to the objective body 45. In principle, it is also possible to use other standardized or proprietary interfaces for connecting the camera 34 to the objective body 45.

In the region of the light entrance opening 39, which defines the distal end of the objective 43, a cover glass 38 is arranged in the objective body 45 or on the objective body 45. In some exemplary embodiments, the cover glass 38 can be a screw-type glass that is screwed into a threaded mount at the distal end of the objective body 45. In other exemplary embodiments, the cover glass 38 can be pushed, clipped or adhesively bonded into a suitable recess on the objective body 45 or can be connected to the objective body 45 in a positionally fixed fashion in some other way. In the preferred exemplary embodiments, the cover glass 38 is connected to the objective body 45 in such a way that a user of the coordinate measuring machine 10 can exchange the cover glass 38 without damaging the objective 43.

In the exemplary embodiment illustrated, the cover glass 38 is a wedge-shaped glass plate, the thickness of which increases from one edge to the other edge, as is illustrated in the simplified sectional illustration in FIG. 2. In this case, the cover glass 38 has a wedge angle chosen such that a reflection at the front side (towards the distal end of the objective 43) or the rear side of the cover glass 38 does not reach the image sensor 36 of the camera 34. Both the front side and the rear side of the cover glass 38 are arranged in an inclined manner with respect to an optical axis of the lens-element groups, which will also be explained below. In other exemplary embodiments, a cover glass having plane-parallel front and rear sides could be arranged slightly obliquely with respect to the image sensor 36 and/or the optical axis (explained in even greater detail below) of the objective 43.

In further exemplary embodiments, the cover glass 38 can be realized in the form of a thin film clamped in the region of the light entrance opening 39 of the objective 43. In some exemplary embodiments, the cover glass can be polarizing, such that the light passing through is polarized, and/or the cover glass can comprise a color filter for suppressing ambient light. The cover glass 38 can also be a $\lambda/4$ plate that brings about a polarization rotation.

In the exemplary embodiment illustrated, a lens-element system having a first lens-element group 40, a second lens-element group 42, a third lens-element group 44 and a fourth lens-element group 46 is arranged between the cover glass 38 and the light exit opening 41 of the objective 43. In some exemplary embodiments, a fifth lens-element group is also arranged between the fourth lens-element group 46 and the light exit opening 41, said fifth lens-element group being represented here by dashed lines. The lens-element groups 40-48 are arranged in the objective body 45 one behind another between the light entrance opening 39 and the light exit opening 41 along a longitudinal axis 49 of the objective body 45. In the exemplary embodiment illustrated, a light beam that passes through the lens-element groups 40-48 in their respective middle or center experiences no deflection, such that the longitudinal axis 49 coincides with an optical axis 50 of the objective 43.

A diaphragm 52 is arranged between the second lens-element group 42 and the third lens-element group 44. In the preferred exemplary embodiments, the diaphragm 52 is an iris diaphragm, i.e. a diaphragm whose clear internal diameter can be varied.

The second, third and fourth lens-element groups 42, 44, 46 and the diaphragm 52 are in each case coupled to a dedicated slide 54 that can be moved along two guide rails 56. Furthermore, the three lens-element groups and the optical diaphragm 52 in this exemplary embodiment are in each case coupled to an electrical drive 58. With the aid of the drives 58, the second, third and fourth lens-element groups and the diaphragm 52 can be moved parallel to the optical axis 50, as is indicated on the basis of the arrows 60. In contrast thereto, the first lens-element group 40 and the optional fifth lens-element group 48 in the preferred exemplary embodiments are arranged in a stationary fashion in the objective body 45.

As can be discerned in FIG. 2, in some exemplary embodiments there is a clearance 62 between the first lens-element group 40 and the second lens-element group 42, said clearance remaining even if the second lens-element group 42 were positioned to a minimum distance with respect to the first lens-element group 40. In the preferred exemplary embodiments, a beam splitter 64 is arranged in the clearance 62 on the optical axis 50 in order selectively to couple in or out light from a further interface 66 of the objective 43. In the preferred exemplary embodiments, the second interface 66 is arranged approximately at the level of the beam splitter 64 on the lateral circumference of the objective body 45.

In a similar manner, in some exemplary embodiments of the objective 43, there is a further clearance 68, in which a beam splitter 70 is likewise arranged, between the fourth lens-element group 46 and the light exit opening 41. A further interface 72, via which light can be coupled in and/or out, is situated at the level of the beam splitter 70. In the exemplary embodiment illustrated, the beam splitter 70 is arranged between the fifth lens-element group 48 and the light exit opening 41. Alternatively or supplementarily thereto, the beam splitter 70 could be arranged between the fourth lens-element group 46 and the fifth lens-element group 48, which of course presupposes a corresponding clearance.

In preferred exemplary embodiments, the objective 43 has in the region of the light entrance opening 39 a holder 74, on which various light sources 76, 78 are arranged. In the exemplary embodiment illustrated, the holder 74 carries a ring light having a multitude of light sources 78a, 78b arranged all around the objective body 45 at different radial distances. In some exemplary embodiments, the light sources 78a, 78b are able to generate different-colored light, for instance white light, red light, green light and blue light and mixtures thereof. The light sources 78a, 78b can be used for producing different illumination scenarios at different distances in front of the light entrance opening 39. By way of example, the reference numeral 12 schematically indicates a measurement object 12 positioned at a distance d from the light entrance opening 39 of the objective 43. The distance d represents an operating distance between the objective 43 and the measurement object 12, wherein said operating distance can be set in a variable manner on the basis of the focusing of the objective 43.

In the present exemplary embodiment, the light sources 76 are light sources that are integrated into the objective body 45. In some exemplary embodiments, the light sources 76 are integrated into the objective body 45 outside the lens-element system, as is illustrated in FIG. 2. In other exemplary embodiments (alternatively or supplementarily), light sources 76 can be integrated into the objective body 45 in such a way that the light generated by the light sources 76 emerges from the objective body 45 at least through some of the lens-element groups and, if appropriate, the cover glass 38. In this case, the light entrance opening 39 is simultaneously also a light exit opening.

The light sources 76, 78 make it possible to illuminate the measurement object 12 in a variable manner in order selectively to generate bright-field and/or dark-field illumination. Both cases involve reflected light that impinges on the measurement object 12 from the direction of the objective 43.

Furthermore, in preferred exemplary embodiments, the coordinate measuring machine 10 has a further light source 82, which enables transmitted-light illumination of the measurement object 12. Accordingly, the light source 82 is arranged below the measurement object 12 or below the workpiece support of the coordinate measuring machine 10. In the preferred exemplary embodiments, therefore, the coordinate measuring machine 10 has a workpiece support 14 provided with a glass plate in order to enable the transmitted-light illumination.

Finally, the optical sensor 18 in these exemplary embodiments has a reflected-light illumination device 84, which here can be coupled to the interface 72 via a further beam splitter. The light source 84 can couple light into the entire beam path of the objective 43 via the interface 72 and the beam splitter 70. The light coupled in is projected onto the measurement object 12 here via the lens-element system of the first to fourth (fifth) lens-element groups.

In the same way, different illuminations can be coupled into the beam path of the objective 43 via the interface 66 and, in principle, also via the light exit opening 41. By way of example, a grating projector is represented by the reference numeral 86. The grating projector generates a structured light pattern which is coupled into the beam path of the objective 43 via two beam splitters and the interface 72 in this exemplary embodiment. In some exemplary embodiments, a light source can be a laser pointer with which individual measurement points on the measurement object 12 can be illuminated in a targeted manner. In other exemplary embodiments, a light source can generate a structured light pattern, for instance a stripe pattern or grating pattern, which is projected onto the measurement object 12 via the lens-element system of the objective 43.

As is illustrated in FIG. 2, the objective 43 can be combined in various ways with optical sensors which serve for optically measuring the measurement object 12 alternatively or supplementarily to the camera 34. In FIG. 2, merely by way of example, a first confocal white light sensor 88a is coupled to the interface 66. Alternatively or supplementarily, a confocal white light sensor 88b can be coupled into the illumination path for the transmitted-light illumination 82 for example via a beam splitter. The sensors 88a and 88b can carry out a punctiform measurement. As will be explained below, a new type of optical distance measurement is proposed in the present case, however, using the clearance 62.

The reference numeral 90 designates an autofocus sensor, which can be used to determine the height position of the measurement object 12 parallel to the optical axis 50 on the basis of a determination of the focal position. Furthermore, an optical measurement of the measurement object 12 is possible with the aid of the camera 34 and a suitable image evaluation, as is known to the relevant persons skilled in the art in this field.

In the preferred exemplary embodiments, the objective 43 has a wide scope of use on account of the movable lens-element groups 42, 44, 46 and the adjustable diaphragm 52. In the preferred exemplary embodiments, a multitude of control curves 92 are stored in a memory of the evaluation and control unit 19 or some other suitable storage device. In the preferred exemplary embodiments, the multitude of control curves 92 forms a 2D curve set which can be used to set the magnification and the focusing of the objective 43 in numerous freely selectable combinations. In the exemplary embodiment illustrated, a user can input a desired magnification 94 and a desired focusing 96 into the evaluation and control unit 19. With the aid of the control curves 92 and in a manner dependent on the desired magnification 94 and desired focusing 96, the evaluation and control unit 19 determines individual positions of the second, third and fourth lens-element groups along the optical axis 50 and an individual position and aperture of the diaphragm 52. In some exemplary embodiments of the new method, the user can vary the operating distance d from a measurement object by varying the focusing, without the sensor 18 having to be moved relative to the measurement object with the aid of the sleeve 14. By way of example, it is thus possible to measure structures on the surface of a measurement object 12 and structures at the bottom of a bore (not illustrated here) of the measurement object 12 by means of only the focusing of the objective 43 being varied, with constant magnification, such that in one case the structure on the surface of the measurement object 12 and in the other case the structure at the bottom of the bore lies in the focal plane of the objective 43.

In other variants, with a constant or changing operating distance d, which denotes a distance between the measurement object 12 and a first disturbing contour, namely the light entrance opening 39 of the objective 43, a user can vary the magnification of the objective 43 in order that, for example, details of a measurement object 12 previously measured "from a bird's eye view" are measured again.

Furthermore, in some exemplary embodiments, a user can vary the numerical aperture of the objective 43 by opening or closing the diaphragm 52 in order in this way to achieve a constant resolution with different operating distances d. Furthermore, a user can vary the magnification, focusing, numerical aperture individually or in combination with one another in order to optimally adapt the objective 43 to the properties of the different sensors 36, 88, 90.

Figure 3:
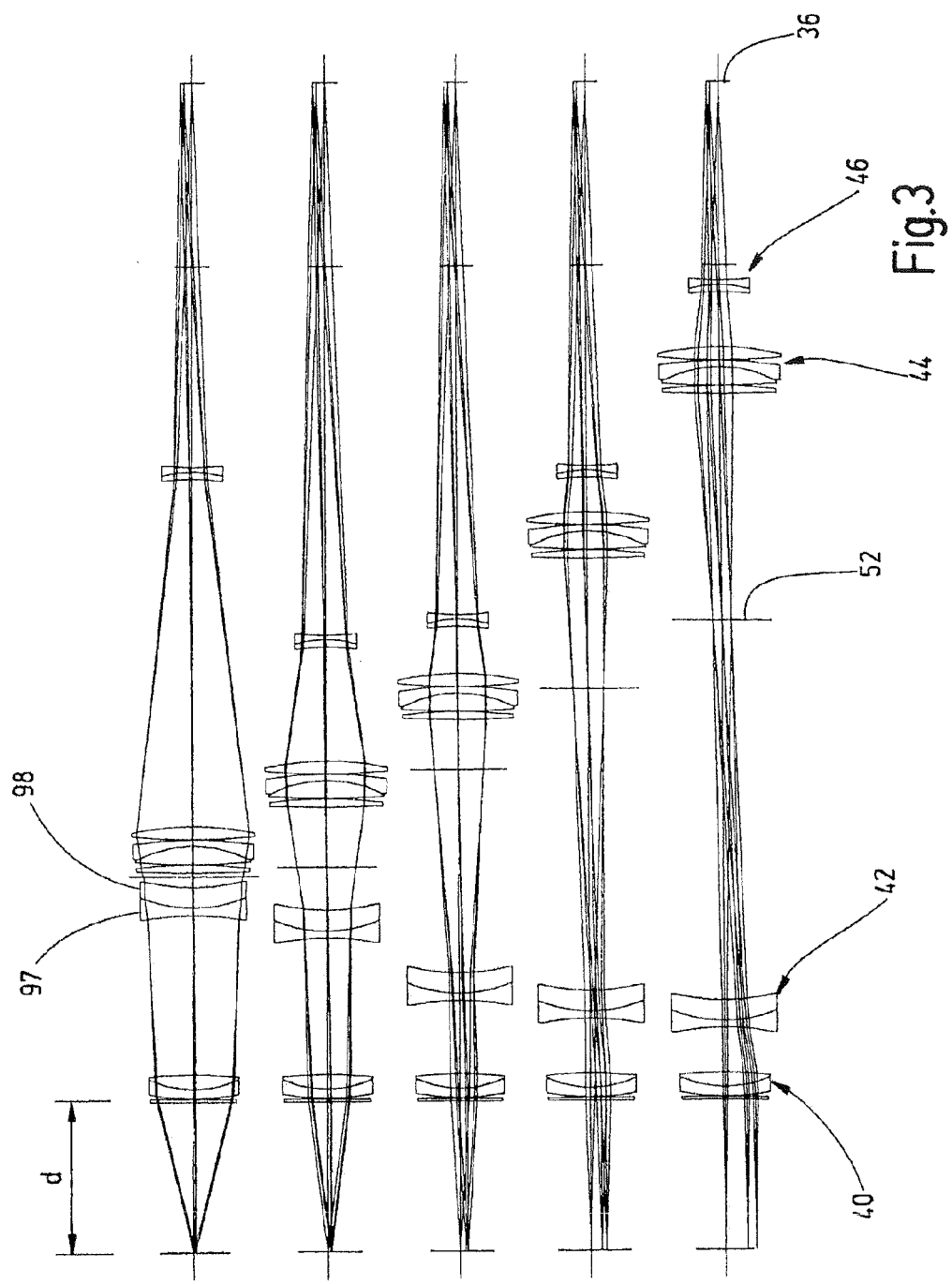
FIG. 3 shows a sectional view of the lens-element groups of the objective from FIG. 2 in accordance with one preferred exemplary embodiment, wherein the lens-element groups are illustrated in five different operating positions representing different magnifications with the same operating distance in each case.
Figure 4:
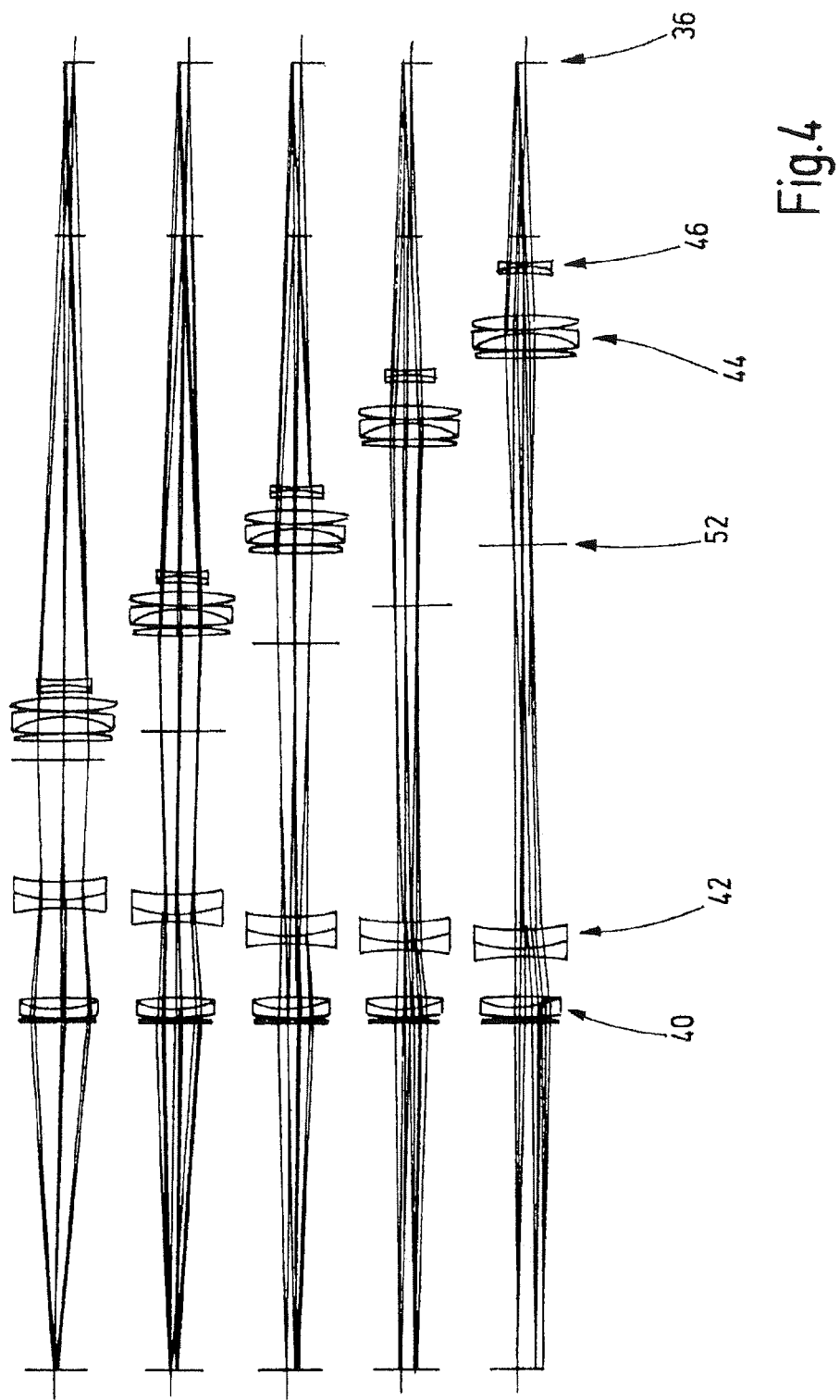
FIG. 4 shows a further sectional view of the objective from FIG. 2 with five different operating positions representing five different magnifications with a different operating distance from that in FIG. 3.
Figure 5:
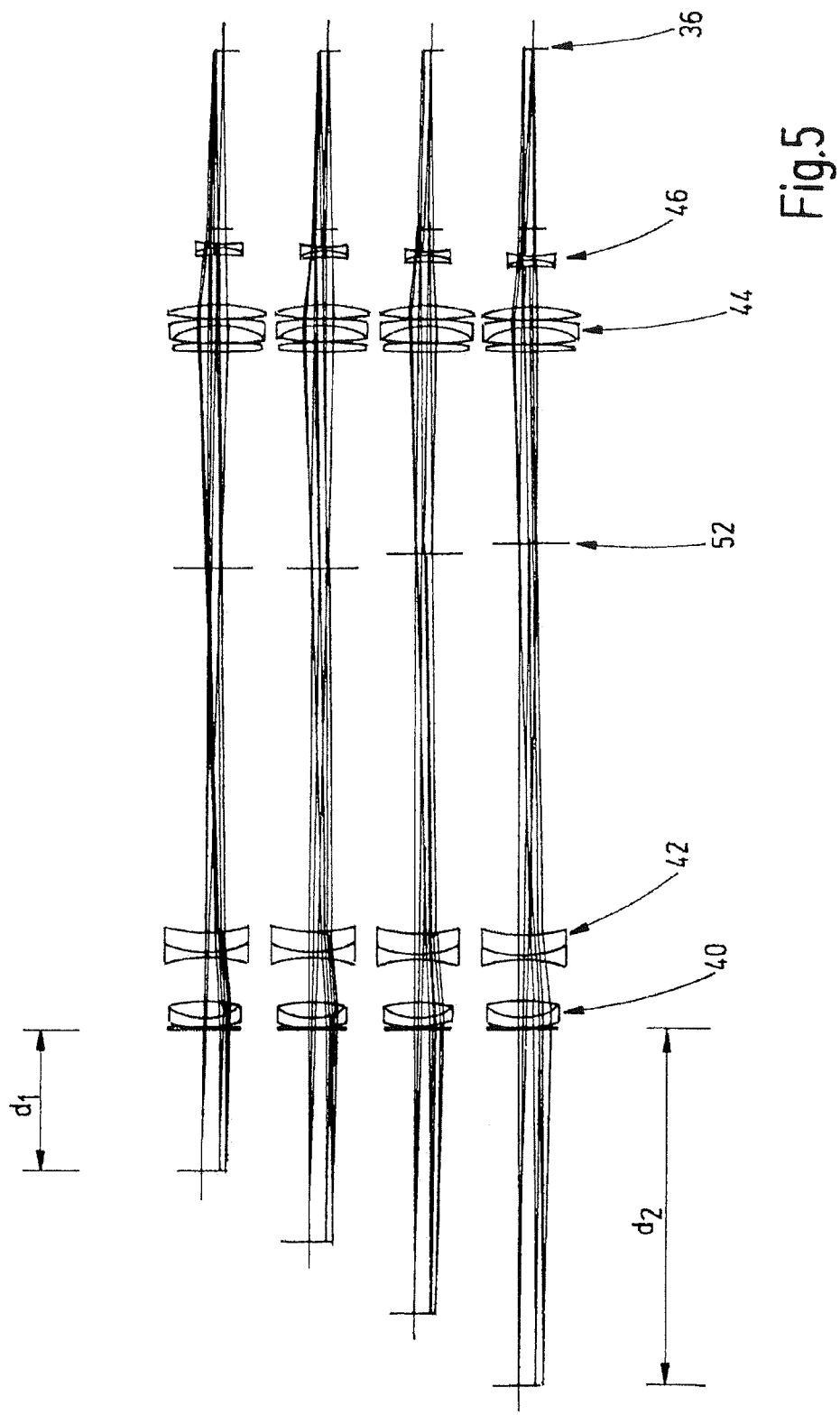
FIG. 5 shows a further sectional view of the objective from FIG. 2, the illustration showing the position of the lens-element groups along the optical axis with in each case the same magnification for five different operating distances.

FIGS. 3 to 5 illustrate the positions of the lens-element groups 40, 42, 44, 46 and the position of the diaphragm 52 for different operating distances d and different magnifications. As can be discerned on the basis of the sectional views, each lens-element group has a plurality of objective elements 97, 98, wherein, in this exemplary embodiment, at least one cement element consisting of at least two objective elements 97, 98 is used in each lens-element group. Some of the lens-element groups have further separate objective elements. At a high magnification, the second and third lens-element groups are close together, wherein the actual distance between the second and third lens-element groups is additionally dependent on the operating distance d. As can be discerned on the basis of FIG. 3, the second and third lens-element groups are closer together in the case of a relatively small operating distance d than in the case of a relatively large operating distance.

With decreasing magnification, the second and third lens-element groups move apart from one another, the second lens-element group approaching the first lens-element group. At the high magnification, the first and second lens-element groups focus a (virtual) image formed by the measurement object upstream of the diaphragm 52. The fourth lens-element group acts as a projective system in this case. It shifts the image into the plane of the image sensor 36. With decreasing magnification, the image formed by the first and second lens-element groups moves further away from the diaphragm. The third and fourth lens-element groups approach one another and with joint positive refractive power image the virtual image onto the plane of the image sensor 36.

In all preferred exemplary embodiments, the diaphragm 52 in each case follows the focal point of the subsystem formed from the first and second lens-element groups. This enables a good field correction with the aid of the third and fourth lens-element groups.

In one preferred exemplary embodiment, a measurement object is arranged at a distance of between 0.8 and two times the focal length of the lens-element group 1. The first lens-element group has a positive refractive power. The second lens-element group has a negative refractive power. The third lens-element group has a positive refractive power, and the fourth lens-element group once again has a negative refractive power. The second, third and fourth lens-element groups are in each case achromatically corrected, while the first lens-element group produces a defined longitudinal chromatic aberration. The diaphragm 52 is situated in each case at the image-side focal point of the subsystem formed from the first and second lens-element groups. A corresponding control curve for the axial position of the diaphragm 52 ensures an object-side telecentricity. The change in the diaphragm diameter allows an object-side aperture adapted to the respective magnification and object structure. The virtual image formed by the first and second lens-element groups is imaged by the third and fourth lens-element groups to a defined location arranged at a defined fixed distance from the first lens-element group. In the preferred exemplary embodiments, the image sensor 36 is situated at said defined location.

The optional fifth lens-element group transforms the image by a constant absolute value with a scalar proportion of the total magnification. In the preferred exemplary embodiments, the total magnification is real without an intermediate image. The design of the system ensures, over the total magnification range, an exit pupil position relative to the image downstream of the fourth lens-element group between half and double the distance to the measurement object. This is advantageous in order to be able to couple illumination light into the objective 43 via the interface 72 and/or the interface 35 with low losses even without a strict image-side telecentricity.

The focal length of the subsystem formed from the first and second lens-element groups increases towards larger object fields and the diaphragm 52 tracks the lens-element groups moving in the direction of the image sensor 36. In this case, the beam heights at the third and fourth lens-element groups are limited on account of the diaphragm, which enables a good overall correction of the imaging. The overall system is underdetermined by the paraxial basic data of magnification, focusing, telecentricity and numerical aperture. With the aid of the control curve for the axial position of the diaphragm, it is possible to achieve a balanced correction of the image aberrations over a large adjustment range of the magnification. In some exemplary embodiments, the ratio between maximum magnification and minimum magnification is greater than 10 and preferably greater than 15.

In the preferred exemplary embodiments, the objective 43 can have transverse chromatic aberrations in order to enable a simple and cost-effective construction. This has the consequence that light and images of different colors can have a small offset transversely with respect to the optical axis 50. In preferred exemplary embodiments, the transverse chromatic aberration is corrected on the basis of mathematical correction calculations, which is possible in the preferred exemplary embodiments because the aberration image as such is continuous.

In some exemplary embodiments of the objective 43, the beam splitter 64 and the cover glass 38 are embodied such that a polarization-optical suppression with extraneous light is achieved. For this purpose, the beam splitter 64 is embodied as a polarizing beam splitter, and the cover glass 38 is a $\lambda/4$ plate. In this way, light that arises for example as a result of internal reflections in the objective body is deflected by the beam splitter 64. Only light that passed with outgoing and return path through the $\lambda/4$ plate was rotated in each case by 45° in the direction of polarization and can then pass through the beam splitter 64 by virtue of the direction of polarization rotated by 90° in total in the direction of the camera 34.

In preferred exemplary embodiments, mount parts of the lens-element groups are blackened, and the lens-element interfaces are provided with antireflection coatings. Interfaces of adjacent objective elements are cemented as much as possible. The individual assemblies are weight-optimized in order to enable rapid movements of the movable lens-element groups and diaphragm.

Figure 6:
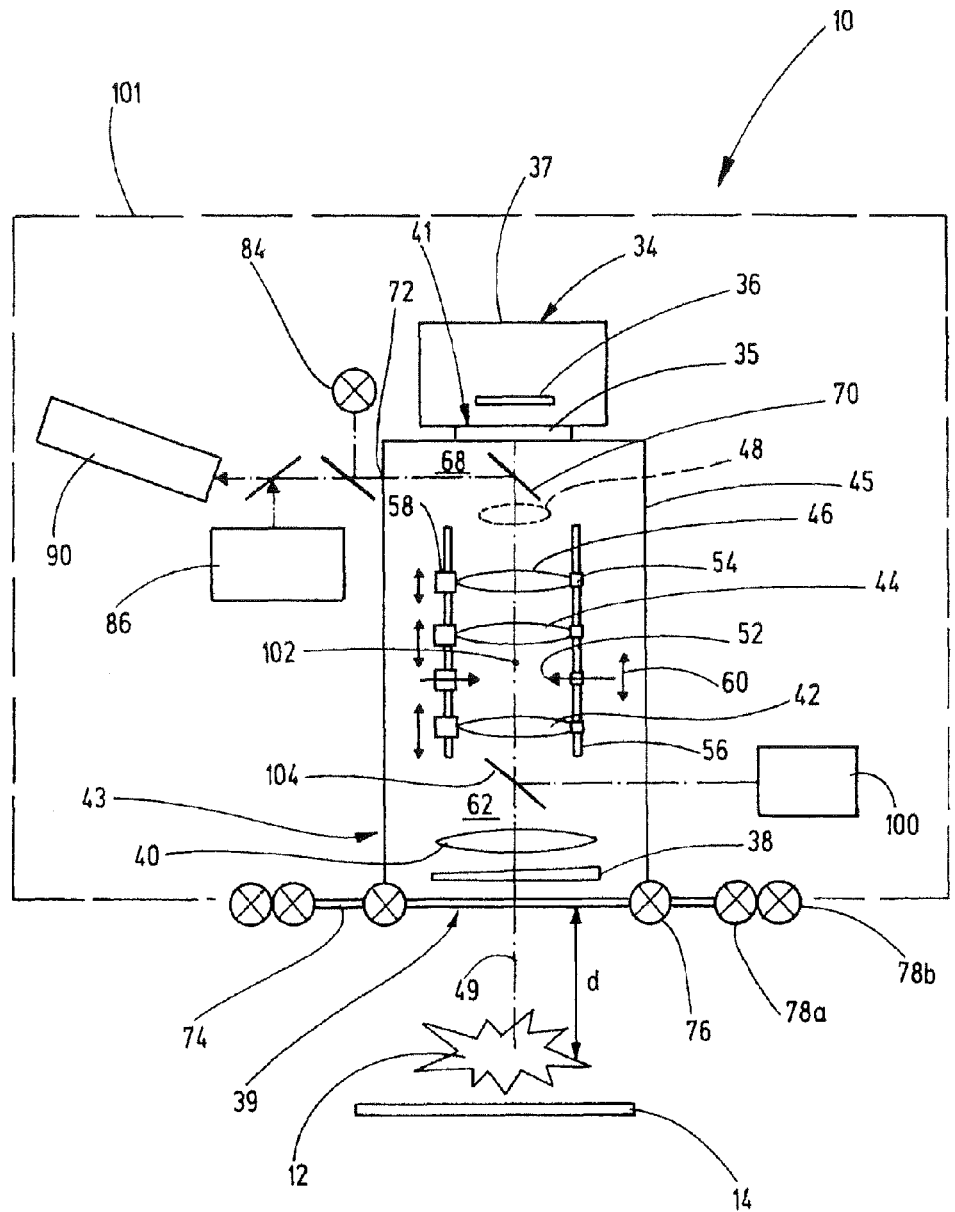
FIG. 6 shows a schematically illustrated exemplary embodiment of a coordinate measuring machine.

FIG. 6 shows an exemplary embodiment of an apparatus 10. In this case, elements identical to those in FIG. 2 are identified by identical reference signs and will not be explained in detail again below.

A calibration arrangement 100 is arranged within a housing 101 of the apparatus 10.

In order to record an image of the calibration arrangement 100 by means of the camera 34, a reflection element 104 is introduced into a beam path 102 of the objective 43. In this way, the calibration arrangement 100 is coupled in optically coaxially with an optical axis 50 of the lens-element groups of the objective 43 by means of the reflection element 104. The camera 34 can thus observe the calibration arrangement 100 via the reflection element 104. The illuminated calibration arrangement 100 is thus imaged onto the camera 34 via the reflection element 104 and the lens-element groups 42, 44, 46, 48 arranged on the image side of the reflection element 104.

Provision can be made for the calibration arrangement 100 to be embodied in a stationary fashion and for only the reflection element 104 to be moved into the beam path 102. However, it is also conceivable for the reflection element 104 and the calibration arrangement 100 to form a jointly moved unit which is moved altogether into the beam path 102 during the movement of the reflection element 104.

The reflection element 104 can be e.g. the rear side of the beam splitter 64 illustrated in FIG. 2.

The reflection element 104 can selectively be introduced into the clearance 62 between the first lens-element group and the second lens-element group 42. In this way, it becomes possible, by selectively introducing the reflection element 104, automatically to initiate a calibration process in which, instead of a calibration standard actually applied to the workpiece carrier 14, the calibration arrangement 100 arranged within the housing 101 of the apparatus 10 is used for calibration.

Figure 7:
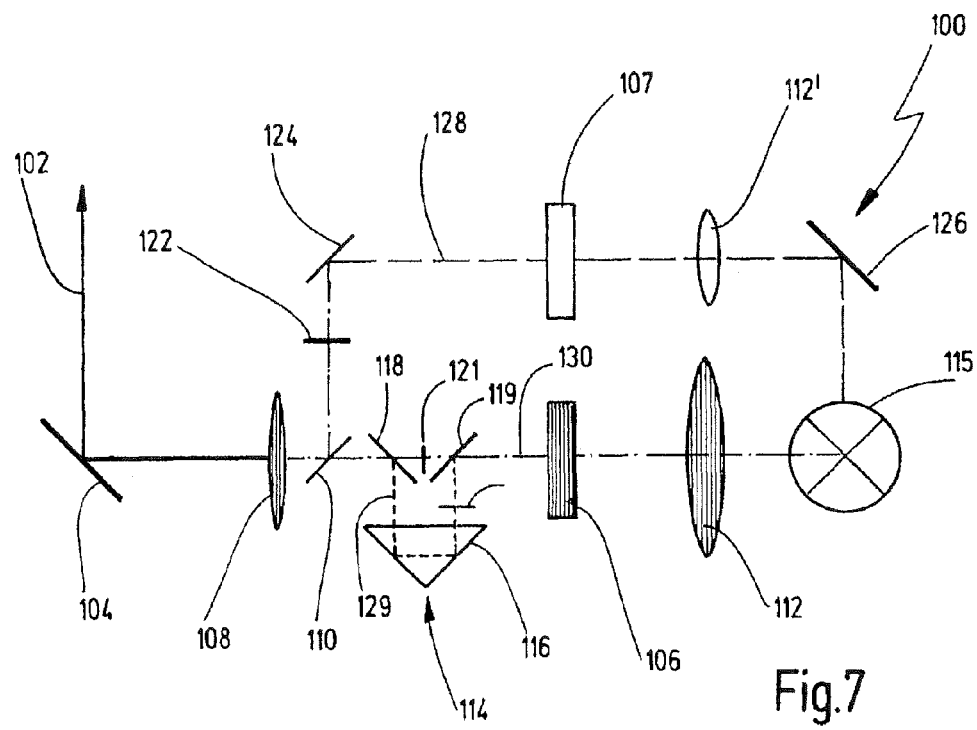
FIG. 7 shows an exemplary embodiment of a calibration arrangement.

FIG. 7 illustrates a first exemplary embodiment of the calibration arrangement 100.

In principle, the calibration arrangement can have a real calibration object 106. In this case, the calibration arrangement 100 will then furthermore have a calibration lens-element assembly 108, the optical properties of which correspond to those of the lens-element groups of the objective 43 that are arranged on the object side, wherein "on the object side" thus denotes the lens-element group 40 in the example illustrated in FIG. 6. In this way, it is therefore possible, by means of the camera 34, to view the real calibration object 106 and as if a calibration standard actually positioned on the workpiece carrier 14 were being viewed. This is because the optical properties of the calibration lens-element assembly 108 correspond to those of the first lens-element group 40. An illumination of the real calibration object 106 can be effected either by means of the reflected-light illumination device 84 or by means of an illumination device 115 that is an element of the calibration arrangement 100. A beam shaping assembly 112 can be provided, which shapes the light from the illumination device 115 suitably onto the real calibration object 106.

In order to be able to embody the calibration arrangement 100 in a manner that saves as much space as possible, a retardation section 114 is provided. Under certain circumstances, the operating distance d may be too large to form it in a linear extent in the calibration arrangement 100. It can also be provided that the apparatus can be operated with a plurality of operating distances, which can then be simultaneously or alternatively switched selectively between the calibration lens-element assembly 108 and the calibration object 106 by means of the retardation section 114. For this purpose, the retardation section is formed by means of two retardation beam splitters 118, 119 and, for example, by means of a prism 116, such that it is possible to deflect the beam path between calibration lens-element assembly 108 and real calibration object 106. It is possible to provide shutter elements 120, 121, in order selectively to optically block the beam path directly from the calibration lens-element assembly 108 to the real calibration object 106, said beam path being designated by the reference sign 130, or a beam path 129 through the retardation section 114.

Alternatively or cumulatively, it is also possible to provide a further real calibration object 107, which can likewise be illuminated by means of the illumination device 115 via a mirror element 126 and a further beam shaping assembly 112'. Alternatively, the illumination can also be carried out by means of the reflected-light illumination device 184. By means of a calibration beam splitter 110 and e.g. via a further mirror element 124, a beam path 128 from the further real calibration object 107 can be superimposed onto the beam path 130 of the real calibration object 106. In this way, a plurality of operating distances can be switched simultaneously or selectively in the calibration arrangement 100. For this purpose, a further shutter element 122 can be provided in the beam path 128 as well.

Figure 8:
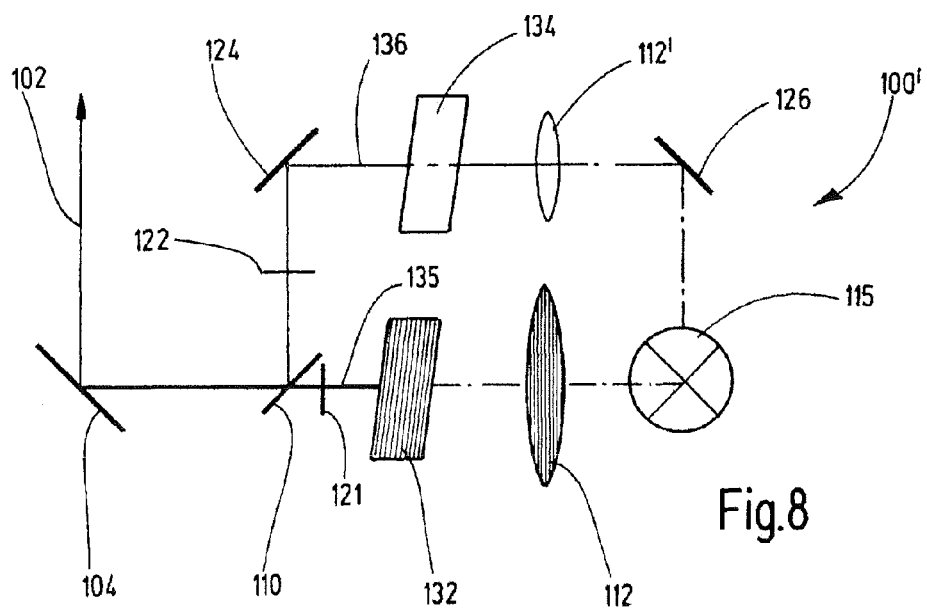
FIG. 8 shows a further exemplary embodiment of a calibration arrangement.

FIG. 8 illustrates a further exemplary embodiment of a calibration arrangement 100'.

Elements identical to those in FIG. 7 are therefore identified by identical reference signs and will not be explained in greater detail. Only the differences are discussed below.

Instead of calibration objects 106, 107, at least one holographic optical element 132 is provided in the embodiment illustrated in FIG. 8. Said element is illuminated and generates an optical field corresponding to that of a beam path of a calibration standard through the lens-element groups on the object side of the reflection element 104. If no lens-element groups are provided in the apparatus 10 on the object side of the reflection element 104, it accordingly corresponds to the beam path of a calibration standard with a corresponding operating distance. An optical image storage element 132 can be provided as a hologram or by means of a diffractive optical element. On the optical image storage element 132 it is also possible to store a plurality of optical fields which can be read out by illumination with different angles and/or with different wavelengths and can be imaged onto the camera 34 via the reflection element 104 via the beam path 102. Thus, it would also be possible in this way to store optical fields of a plurality of operating distances on an optical image storage element 132, in particular a holographic optical element. Alternatively or cumulatively, however, it can also be provided that further optical image storage elements, in particular holographic optical elements 134, can be read out via a calibration beam splitter 110 and can be imaged onto the camera 34. For this purpose, a beam path 136 of the further optical image storage element 134 and a beam path 135 of the optical image storage element 132 are superimposed by means of the calibration beam splitter 110. Shutter elements 121, 122 can be provided in the exemplary embodiment of the calibration arrangement 100' as well, in order selectively to optically block the beam paths 135, 136.

Figure 9:
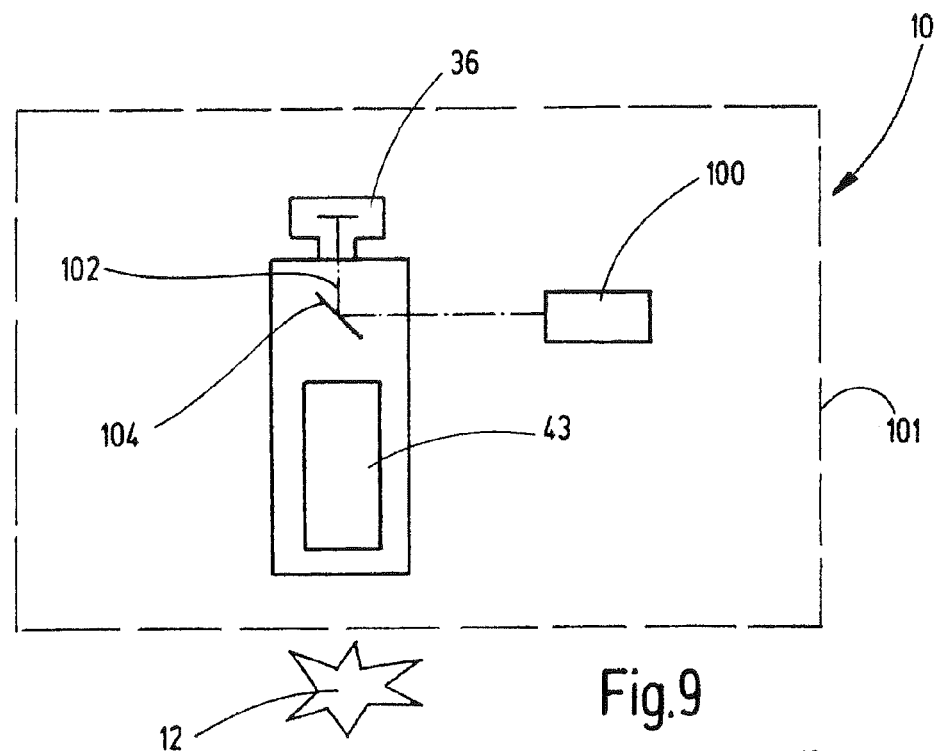
FIG. 9 shows a further schematically illustrated exemplary embodiment of a coordinate measuring machine.

FIG. 9 schematically illustrates that, in principle, the calibration arrangement can also be coupled in on the image side of all lens-element groups 40 to 48 of the objective 43 or on the image side of the objective 43 by means of the reflection element 104. By way of example, in this way, it is also possible to test a reflected-light illumination device 84, for instance in terms of its emission spectrum, or else e.g. an autofocus sensor 90 with an associated grating illumination 86. Furthermore, it is thus possible to test the scale stability of the camera with its individual detector elements since, by means thereof, the later material measure is achieved in the measurement.

Figure 10:
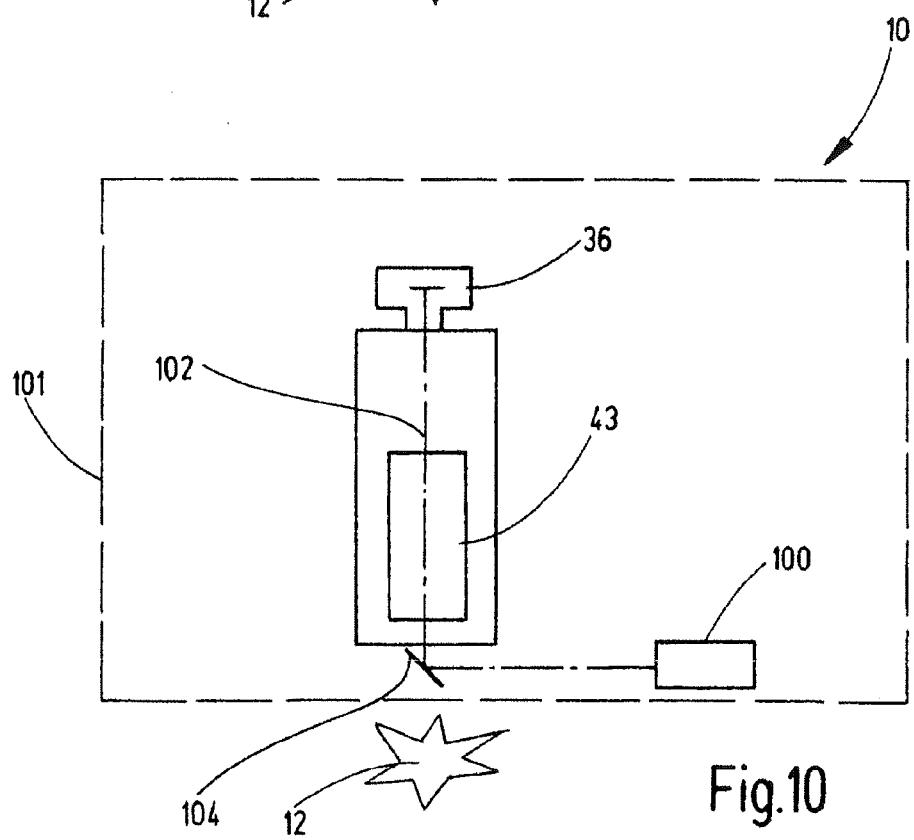
FIG. 10 shows yet another schematically illustrated exemplary embodiment of a coordinate measuring machine.

FIG. 10 schematically illustrates that, in principle, the calibration arrangement 100 can also be arranged on the object side of all the lens-element groups 40 to 48 of the objective 43 or on the object side of the objective 43. The beam path 102 then runs from the reflection element 104 through the entire objective 43 to the camera 34. No calibration lens-element assembly 108 is necessary in this case. Both in the exemplary embodiment in FIG. 9 and in the exemplary embodiment in FIG. 10, provision can be made for the calibration arrangement 100 to be arranged within the housing 101 of the apparatus 10.

Figure 11:
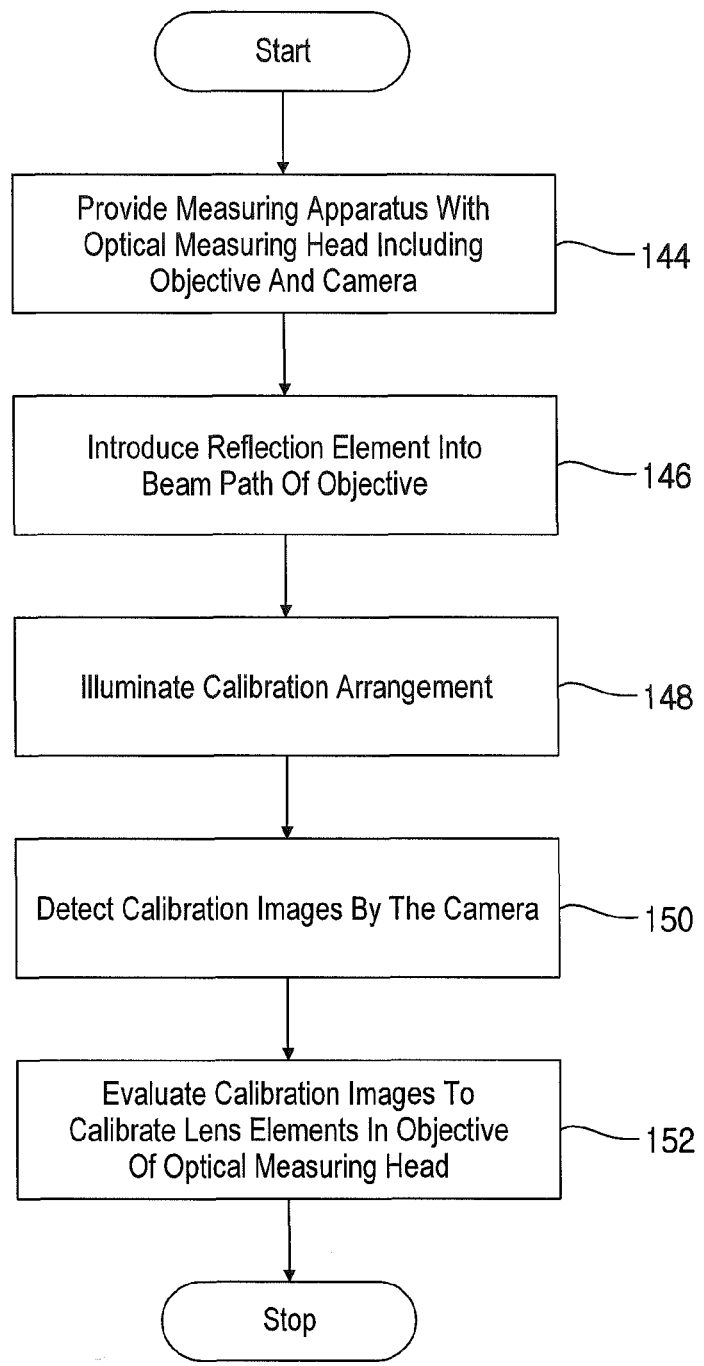
FIG. 11 shows a schematic flowchart of an exemplary embodiment of a method for calibration.

FIG. 11 schematically shows a flowchart of an embodiment of a method for calibrating the apparatus 10 for inspecting the measurement object 12.

The method begins with a start step 142. A step 141 then involves firstly providing the apparatus 10 comprising a measuring head 15 carrying an optical sensor 18, wherein the optical sensor 18 has a objective 43 and a camera 34, which is designed to capture an image of the measurement object 12 through the objective 43, wherein the objective 43 has a light entrance opening 39 and a light exit opening 41, wherein the objective 43 has a multitude of lens-element groups 40, 42, 44, 46, 48 which are arranged in the objective 43 between the light entrance opening 39 and the light exit opening 41 one behind another along a longitudinal axis 49 of the objective 43, and wherein the apparatus 10 furthermore has a reflection element 104 and a calibration arrangement 100.

According to a step 146, the reflection element is then introduced in a beam path 102 running through the objective to the camera, as has been described above. As a result, the calibration arrangement 100 is coupled into the beam path 102 to the camera 34 by means of the reflection element 104.

The calibration arrangement 100 is then illuminated in a step 148. This can be effected by means of the reflected-light illumination device 84 or the illumination device 115 of the calibration arrangement 100.

Calibration images are then detected by the camera 34 in a step 150. Said calibration images capture an imaging of a real calibration object 106, 107 or the optical field which is read out from one of the optical image storage elements 132, 134.

By means of captured calibration images, it is then possible, in a step 152, to calibrate the apparatus 10, in particular the control curves of the apparatus 10 for the movable optical elements 42, 44, 46, and those of the movable diaphragm 52, by evaluating the calibration images.

The calibration method then ends in a step 154.

What is claimed is:

1. An apparatus for inspecting a measurement object, comprising a workpiece support for supporting the measurement object and a measuring head carrying an optical sensor, wherein the measuring head and the workpiece support are movable relative to one another, wherein the optical sensor has a objective and a camera, which is designed to capture an image of the measurement object through the objective, wherein the objective has a light entrance opening and a light exit opening, wherein the objective has a multitude of lens-element groups which are arranged in the objective between the light entrance opening and the light exit opening one behind another along a longitudinal axis of the objective, and wherein the apparatus furthermore comprises a reflection element and a calibration arrangement, wherein the reflection element can selectively be introduced into a beam path running through the objective to the camera, in order to couple the calibration arrangement into the beam path to the camera by means of the reflection element.

2. The apparatus as claimed in claim 1, wherein the reflection element can be introduced into the beam path between two lens-element groups of the multitude of lens-element groups.

3. The apparatus as claimed in claim 1, wherein the multitude of lens-element groups comprises at least one lens-element group which is movable parallel to the longitudinal axis, and wherein the reflection element can be introduced into the beam path on the object side of all lens-element groups which are movable parallel to the longitudinal axis.

4. The apparatus as claimed in claim 1, wherein the calibration arrangement has at least one real calibration object.

5. The apparatus as claimed in claim 4, wherein the calibration arrangement has a calibration lens-element assembly, wherein the calibration lens-element assembly corresponds in terms of its optical properties to the lens-element groups arranged on the object side of the reflection element.

6. The apparatus as claimed in claim 4, wherein the calibration arrangement has a plurality of real calibration objects, wherein the calibration arrangement has at least one calibration beam splitter, and wherein the at least one calibration beam splitter is arranged in such a way that the beam paths of all the real calibration objects are superimposed onto the reflection element.

7. The apparatus as claimed in claim 6, wherein a shutter element is arranged in each beam path to a real calibration object, in order selectively to block the corresponding beam path.

8. The apparatus as claimed in claim 4, wherein in the beam path of the at least one real calibration object a retardation section is coupled in by means of two retardation beam splitters.

9. The apparatus as claimed in claim 8, wherein a shutter element is arranged in the optical retardation section, in order selectively to block the corresponding beam path.

10. The apparatus as claimed in claim 1, wherein the calibration arrangement has at least one optical image storage element, wherein the optical image storage element is a holographic optical element or a diffractive optical element.

11. The apparatus as claimed in claim 10, wherein an optical field corresponding to that of a calibration object arranged on the object side of the reflection element is stored on the optical image storage element.

12. The apparatus as claimed in claim 11, wherein the calibration arrangement has an optical image storage element that is a holographic optical element or a diffractive optical element, wherein a plurality of optical fields are stored on the optical image storage element in a wavelength-dependent manner and/or in an illumination-angle-dependent manner.

13. The apparatus as claimed in claim 12, wherein the calibration arrangement has a plurality of optical image storage elements, wherein the calibration arrangement has at least one calibration beam splitter, and wherein the at least one calibration beam splitter is arranged in such a way that the beam paths of all the optical image storage elements are superimposed onto the reflection element.

14. The apparatus as claimed in claim 11, wherein the calibration arrangement has a plurality of optical image storage elements, wherein the calibration arrangement has at least one calibration beam splitter, and wherein the at least one calibration beam splitter is arranged in such a way that the beam paths of all the optical image storage elements are superimposed onto the reflection element.

15. The apparatus as claimed in claim 1, wherein the objective has a diaphragm and at least four lens-element groups, wherein a first lens-element group is the lens-element group arranged the furthest on the object side and is embodied in a stationary fashion, wherein at least a second lens-element group and a third lens-element group are displaceable relative to the first lens-element group along the longitudinal axis, and wherein the reflection element can be introduced between the first lens-element group and the second lens-element group.

16. The apparatus as claimed in claim 15, wherein a diaphragm and the second lens-element group, the third lens-element group and a fourth lens-element group from the at least four lens-element groups are displaceable relative to the first lens-element group along the longitudinal axis, wherein the second lens-element group is arranged between the first lens-element group and the diaphragm, and wherein the third and fourth lens-element group are arranged between the diaphragm and the light exit opening.

17. The apparatus as claimed in claim 1, wherein at least two lens-element groups are displaceable parallel to the longitudinal axis.

18. The apparatus as claimed in claim 1, wherein the reflection element can be introduced into the beam path on the image side or on the object side of the multitude of lens-element groups.

19. The apparatus as claimed in claim 1, wherein the calibration arrangement is arranged within a housing of the apparatus.

20. A method for calibrating an apparatus for inspecting a measurement object, comprising the following steps:
    providing an apparatus comprising a measuring head carrying an optical sensor, wherein the optical sensor has a objective and a camera, which is designed to capture an image of the measurement object through the objective, wherein the objective has a light entrance opening and a light exit opening, wherein the objective has a multitude of lens-element groups which are arranged in the objective between the light entrance opening and the light exit opening one behind another along a longitudinal axis of the objective, and wherein the apparatus furthermore comprises a reflection element and a calibration arrangement, introducing the reflection element into a beam path running through the objective to the camera, wherein the calibration arrangement is thereby coupled into the beam path to the camera by means of the reflection element, illuminating the calibration arrangement, detecting calibration images by means of the camera, and calibrating the apparatus by evaluating the calibration images.

* * * * *